US005768397A

United States Patent [19]

Fazio

[11] Patent Number: 5,768,397
[45] Date of Patent: Jun. 16, 1998

[54] HEARING AID AND SYSTEM FOR USE WITH CELLULAR TELEPHONES

[75] Inventor: Joseph D. Fazio, Bernardsville, N.J.

[73] Assignee: Siemens Hearing Instruments, Inc., Piscataway, N.J.

[21] Appl. No.: 701,408

[22] Filed: Aug. 22, 1996

[51] Int. Cl.[6] .................................................. H04R 25/00
[52] U.S. Cl. ........................... 381/68; 381/68.6; 381/187; 379/430
[58] Field of Search ......................... 381/68, 68.6, 23.1, 381/183, 187; 379/430, 52

[56] References Cited

U.S. PATENT DOCUMENTS

| 4,588,867 | 5/1986 | Konomi .................................. 379/430 |
| 4,596,899 | 6/1986 | Wojcik et al. .......................... 381/68.4 |
| 4,633,498 | 12/1986 | Warnke et al. ......................... 381/23.1 |
| 4,777,474 | 10/1988 | Clayton .................................. 381/23.1 |
| 4,864,611 | 9/1989 | Helmuth ................................... 379/52 |
| 4,930,156 | 5/1990 | Norris .................................... 379/430 |
| 5,086,464 | 2/1992 | Groppe ..................................... 381/68 |
| 5,226,086 | 7/1993 | Platt ........................................ 379/52 |
| 5,363,444 | 11/1994 | Norris ................................... 381/68.6 |
| 5,373,555 | 12/1994 | Norris et al. ......................... 381/68.6 |
| 5,448,637 | 9/1995 | Yamaguchi et al. ................... 381/68.6 |
| 5,506,911 | 4/1996 | Neuman et al. ......................... 381/187 |
| 5,539,806 | 7/1996 | Allen et al. .............................. 381/68.2 |
| 5,606,607 | 2/1997 | Yamaguchi et al. ................... 381/68.6 |
| 5,610,988 | 3/1997 | Miyahara ................................. 381/69 |
| 5,613,222 | 3/1997 | Guenther ............................... 381/183 |
| 5,627,521 | 5/1997 | Olsen et al. .......................... 381/68.6 |
| 5,642,426 | 6/1997 | Neuman et al. .......................... 381/68 |
| 5,664,014 | 9/1997 | Yamaguchi et al. ................... 381/68.6 |

FOREIGN PATENT DOCUMENTS

| 0 517323 B1 | 9/1995 | European Pat. Off. . |
| 35 08830 A1 | 9/1986 | Germany . |
| 0154800 | 8/1985 | Japan ....................................... 381/68 |
| 0596238 | 3/1978 | U.S.S.R. ................................... 381/68 |

OTHER PUBLICATIONS

"A set of 4 IC's In CMOS Technology for a programmable Hearing Aid", Callias, IEEE 1988, pp. 12.6.1–12.6.4.

Primary Examiner—Curtis Kuntz
Assistant Examiner—Xu Mei
Attorney, Agent, or Firm—Mark H. Jay

[57] ABSTRACT

The light output of an IR LED mounted on a cellular telephone is modulated by the audio output of the telephone and made incident upon a photodiode mounted to an ITE-type or canal-type hearing aid. The electrical signal output from the photodiode is routed through a bandpass filter, demodulated in a demodulator and amplified and/or processed in the hearing aid circuit.

7 Claims, 2 Drawing Sheets

HEARING AID AND SYSTEM FOR USE WITH CELLULAR TELEPHONES

BACKGROUND OF THE INVENTION

The invention relates to hearing aids, and more particularly relates to hearing aids for use with cellular telephones.

In conventional telephone-compatible hearing aids, a telecoil is coupled to the magnetic field produced by the telephone earpiece. When such an aid is in use, the signal from the telecoil is amplified by the hearing aid circuit and routed to the hearing aid receiver for conversion into sound.

Such conventional hearing aids are unsuitable for use with cellular telephones. There are two reasons for this. The first reason is that cellular telephone receivers do not produce a field of sufficient strength to permit telecoil coupling. The second reason is that cellular telephones emit RF pulses, which do couple to the telecoil and which can make a hearing aid inoperative even at a distance of one meter.

It would be advantageous to provide a hearing aid that would be compatible with a cellular telephone.

Accordingly, one object of the invention is to provide a hearing aid that would be compatible with cellular telephones.

Another object is to provide a hearing aid system that could be retrofitted to, and used with, existing cellular telephones.

Still another object is, in general, to improve upon known hearing aids.

In accordance with the invention, the cellular telephone is provided with a light-emitting diode ("LED"), which is advantageously of the infrared type. The LED emits a signal made up of an carrier frequency that is modulated by audio-frequency electrical signals output from the telephone. Where the cellular telephone is of the type that has an audio output jack, the telephone can be retrofitted by making a connection with the jack. It is alternatively possible to so design the telephone that the LED is part of the telephone at the time of manufacture and not later added on.

Also in accordance with the invention, a hearing aid with a microphone, a receiver, and a hearing aid circuit is also provided with a photodiode. The photodiode is connected to a bandpass filter, which filters out noise picked up at the photodiode and prevents such noise from being transmitted to subsequent circuitry. The signal from the bandpass filter is routed to an audio-frequency demodulator, which separates out the audio signal. The audio signal can then be routed to the hearing aid circuit, via a patient-operated switch.

When the patient wishes to use the aid with a cellular telephone, the switch is placed into a first state in which the receiver is operatively responsive to signals from the demodulator. Then, the audio-modulated output from the LED is received at the photodiode, filtered, demodulated and routed to the hearing aid circuit for conversion into sound in the receiver. When the patient is finished with the cellular telephone, the switch is placed into a second state in which the receiver is operatively responsive to signals from the microphone. This prevents ambient noise from being picked up by the aid and transmitted to the patient.

The invention will be better understood with reference to the following exemplary and non-limiting drawings, in which

DETAILED DESCRIPTION OF PREFERRED EMBODIMENTS

Figure 1A:
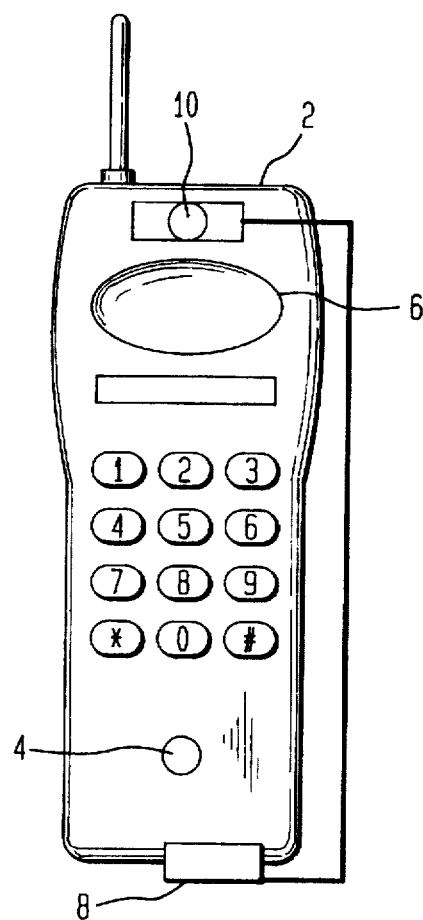
FIGS. 1A and 1B schematically illustrate cellular telephones that have, respectively, been retrofitted in accordance with a preferred embodiment of the invention and provided with a preferred embodiment of the invention upon manufacture.

A conventional cellular telephone generally indicated by reference number 2 in FIG. 1A has a microphone 4, a receiver 6 and an audio jack 8. The audio jack 8 permits the audio output from the telephone 2 to be coupled to an external device.

In accordance with the invention, an IR LED 10 is mounted to the receiver 6. The LED 10 is driven by an oscillator 7, which produces a carrier signal of e.g. 95 kHz. The light output of the LED 10 is modulated by audio-frequency signals from the telephone 2. In the preferred embodiment, this is accomplished by modulating the carrier signal from the oscillator 7 using a modulator circuit 14, which itself is connected to the audio jack 8. Advantageously, the oscillator 7 and the modulator circuit 14 are powered by the same power source 12 that powers the telephone 2, but this is not required.

Figure 1B:
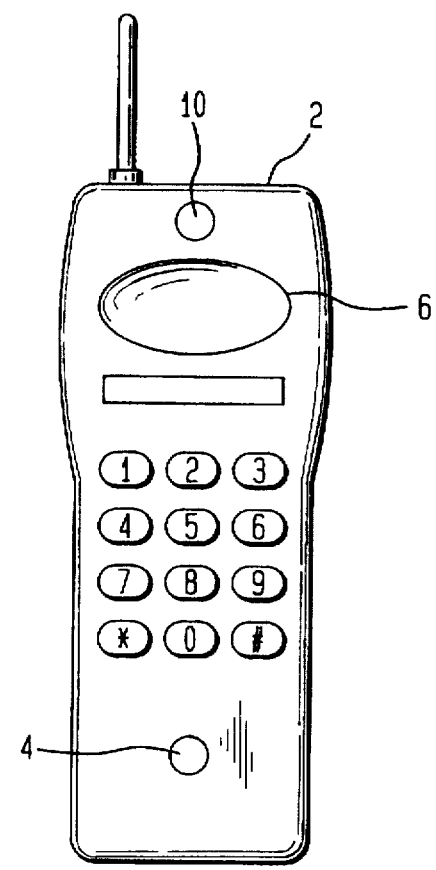
Figure 2:
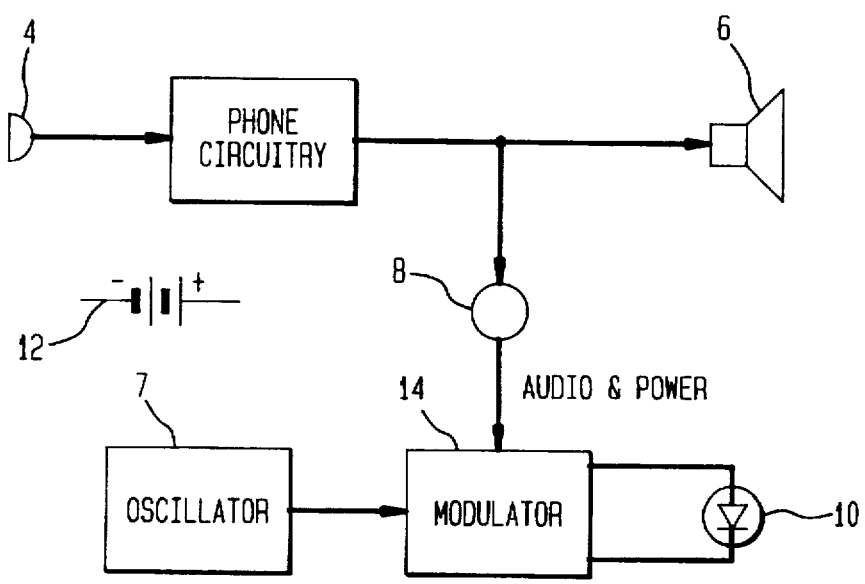
FIG. 2 schematically illustrates a circuit used with a cellular telephone in accordance with the preferred embodiment of the invention.

It is not necessary to retrofit a conventional cellular telephone 2. It is alternatively possible to produce a cellular telephone 2' (FIG. 1B) in which the LED 10 is part of the telephone at the time of manufacture.

Figure 3:
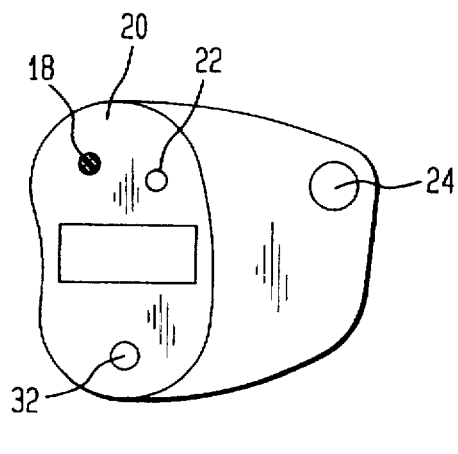
FIG. 3 schematically illustrates an ITE hearing aid in accordance with a preferred embodiment of the invention.
Figure 4:
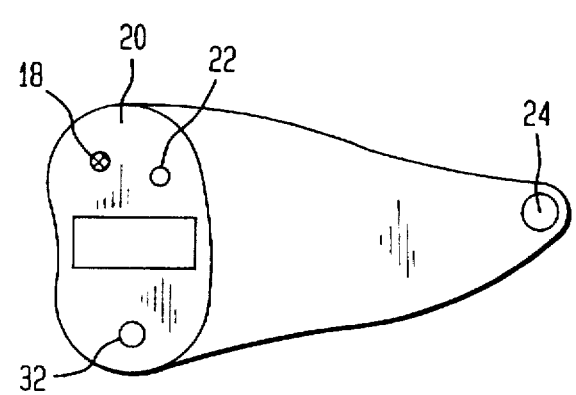
FIG. 4 schematically illustrates a canal aid in accordance with a preferred embodiment of the invention.
Figure 5:
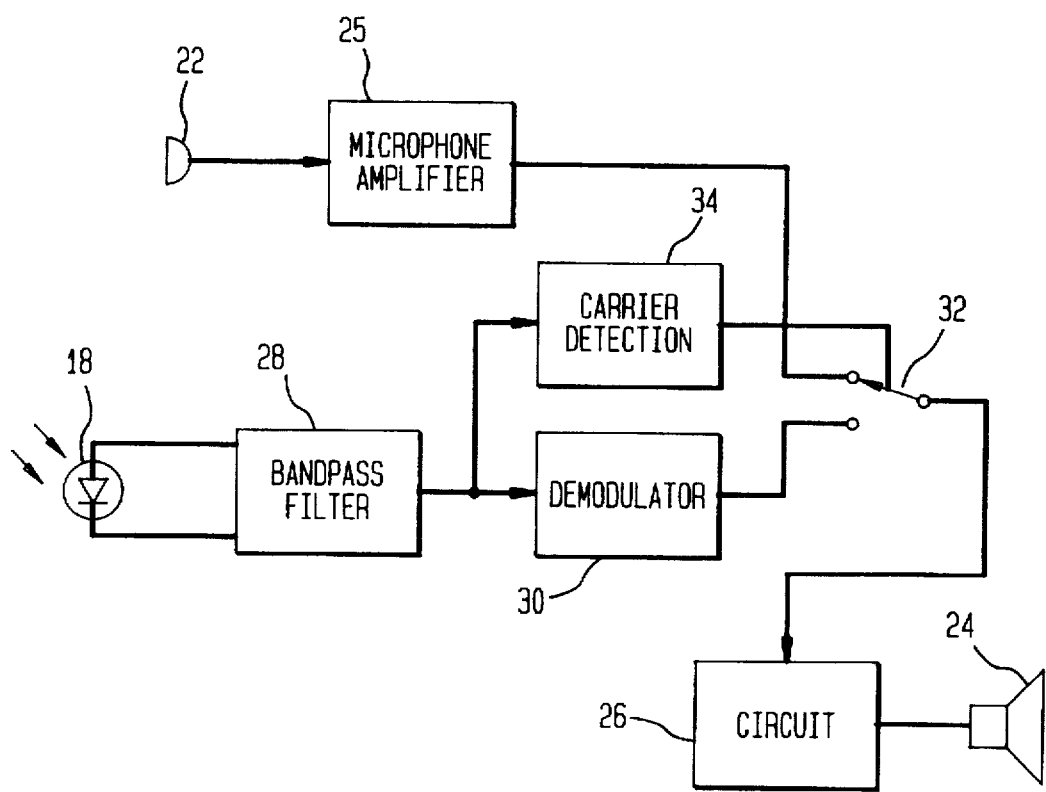
FIG. 5 schematically illustrates a circuit used with a hearing aid in accordance with the preferred embodiment of the invention.

In further accordance with the invention, a hearing aid generally indicated by reference number 16 is provided with an IR photodiode 18. Advantageously, the hearing aid 16 has a housing 20 of the in-the-ear ("ITE") type (FIG. 3) or the canal aid type (FIG. 4), and the photodiode 18 is so mounted in the housing 20 that IR light from the LED 10 can be incident upon the photodiode 18.

The hearing aid 16 has a microphone 22, a receiver 24, a microphone amplifier 25 and a hearing aid circuit 26, all connected to a power supply (not shown). These elements are conventional and are well-known by themselves, and can be operatively connected so that sound present at the microphone 22 will be converted into electrical signals, amplified and processed in the amplifier 25 and the circuit 26 and converted back to sound in the receiver 24.

In accordance with the invention, the output of the photodiode 18 is connected to a bandpass filter 28. (The additional stages are likewise connected to a power supply, not shown.) The bandpass filter 28 filters out all signals that are outside the carrier frequency (i.e. noise frequencies from electric lighting). The output from the bandpass filter 28 is connected to the input of an audio-frequency demodulator 30, which extracts the audio-frequency signals between 300 Hz and 3300 Hz. The output of the demodulator 30 can be connected to the amplifier circuit 26 through a SPDT switch 32.

The switch 32 is used to select between standard hearing aid listening and telephone access. When the aid 16 is used with a cellular telephone 2, the switch 32 is placed in a first state, wherein the receiver 24 is operatively responsive to signals from the demodulator 30. In use, the receiver 6 is put up to the patient's ear (not shown), and audio from the telephone 2 modulates the light output from the LED 10. This light output, which is incident upon the photodiode 18, causes the signal at the output of the photodiode 18 to reflect the transmitted modulated signal. Audio information from the telephone 2 is then separated out of the carrier in the demodulator 30. This audio signal is then amplified and/or processed in the circuit 26 and converted to sound in the receiver 24. When the aid 16 is to be used otherwise than with a cellular telephone 2, the switch 32 is in a second state, wherein the receiver 24 is operatively responsive to signals from the microphone 22. Signals from the microphone 22 are then amplified in the amplifier 25 and routed to the circuit 26, from where they are converted to sound pressure by receiver 24 as in a conventional hearing aid.

In this example, the switch 32 is electronic. Because the switch 32 is electronic, it is possible to automate the switching process by using a carrier detection circuit 34 to monitor the output from the bandpass filter 28. The carrier detection circuit 34 is connected to the switch 32 in such a manner that the state of the switch 32 is made automatically dependent upon the presence and absence of the IR carrier frequency at the output of the bandpass filter 28. When the carrier detection circuit 34 detects the presence of the IR carrier at the output of the bandpass filter 28, the switch 32 is placed in the first state. When the carrier detection circuit 34 does not detect the presence of the IR carrier at the output of the bandpass filter 28, the switch 32 is placed in the second state. It is not necessary to provide such sutomatic switching; it is alternatively possible for the switch 32 to be a toggle switch or a pushbutton mounted on the face of the hearing aid for manual operation by the patient.

Because the invention does not utilize a telecoil, the RF signals emitted by the telephone 2 are not picked up by the aid 16 and do not make the aid inoperative.

Although a preferred embodiment has been described above, the scope of the invention is limited only by the following claims:

I claim:

1. A hearing aid for use with a light-emitting diode (LED)-equipped cellular telephone, comprising:

a microphone;

a receiver;

a hearing aid circuit operatively connected to the microphone and receiver;

a photodiode;

an audio-frequency demodulator;

a bandpass filter connected in series between the photodiode and the demodulator; and switch means having a first state and a second state, the switch means causing the receiver to be operatively responsive to signals from the demodulator when in the first state and causing the receiver to be operatively responsive to signals from the microphone when in the second states.

2. The hearing aid of claim 1, further including an in-the-ear (ITE) hearing aid housing.

3. The hearing aid of claim 1, further including a canal aid hearing aid housing.

4. The hearing aid of claim 1, wherein the photodiode is of the infra-red type.

5. The hearing aid of claim 1, wherein the state of the switch means is determined automatically.

6. A hearing aid system for use with a cellular telephone, comprising:

a light-emitting diode (LED) operatively connected to the cellular telephone in such as manner as to produce a light output that is modulated by audio-frequency electrical signals output by the telephone; and a hearing aid, the hearing aid comprising
   a microphone,
   a receiver,
   a hearing aid circuit operatively connected to the microphone and receiver,
   a photodiode,
   an audio-frequency demodulator,
   a bandpass filter connected in series between the photodiode and the demodulator, and
   a switch electrically located between the demodulator and the hearing aid circuit, the switch selectively connecting the demodulator to the hearing aid circuit.

7. The system of claim 6, wherein the cellular telephone has an audio port and the LED is operatively connected to the audio port.

\* \* \* \* \*

UNITED STATES PATENT AND TRADEMARK OFFICE
CERTIFICATE OF CORRECTION

PATENT NO. : 5,768,397
DATED : June 16, 1998
INVENTOR(S) : Joseph D. Fazio

It is certified that error appears in the above-indentified patent and that said Letters Patent is hereby corrected as shown below:

On the title page, item [56], insert the following:

FOREIGN PATENT OR PUBLISHED FOREIGN PATENT APPLICATION

| | | | | | | | | PUBLICATION | COUNTRY OR | | | TRANSLATION | |
|---|---|---|---|---|---|---|---|---|---|---|---|---|---|
| | | DOCUMENT NUMBER | | | | | | DATE | PATENT OFFICE | CLASS | SUBCLASS | YES | NO |
| | 6 | 0 | 0 | 7 | 2 | 7 | A | 30-06-78 | Switzerland | | | | |
| | 0 | 5 | 1 | 7 | 3 | 2 | 3 A 2 | 09-12-92 | Europe | | | | |
| | 0 | 6 | 2 | 6 | 7 | 7 | 3 A1 | 30-11-94 | Europe | | | | |
| | 2 | 8 | 3 | 7 | 9 | 0 | 7 A1 | 06-03-80 | Germany | | | | |
| | 2 | 2 | 9 | 4 | 1 | 7 | 7 A | 17-04-96 | Great Britain | | | | |
| | 9 | 6 | 2 | 1 | 3 | 0 | 7 | 11-07-96 | WO | | | | |
| | 2 | 8 | 4 | 4 | 9 | 7 | 9 A1 | 17-04-80 | Germany | | | | |
| | 0 | 2 | 7 | 9 | 9 | 1 | 4 A2 | 31-08-88 | Europe | | | | |

Signed and Sealed this

Twenty-sixth Day of October, 1999

Attest:

Attesting Officer

Q. TODD DICKINSON

Acting Commissioner of Patents and Trademarks